United States Patent [19]

Abdelrazig et al.

[11] Patent Number: 5,389,143
[45] Date of Patent: Feb. 14, 1995

[54] LOW SHRINKAGE CEMENT COMPOSITION

[75] Inventors: Ismail Abdelrazig, Columbia, Md.; Paul C. Scheiner, Maynard, Mass.

[73] Assignee: W. R. Grace & Co.-Conn., New York, N.Y.

[21] Appl. No.: 99,758

[22] Filed: Jul. 29, 1993

[51] Int. Cl.$^6$ ............................................. C04B 24/12
[52] U.S. Cl. ..................................... 106/696; 106/724; 106/727; 106/819; 106/823
[58] Field of Search ............... 106/696, 727, 724, 819, 106/821, 823

[56] References Cited

U.S. PATENT DOCUMENTS

| | | | |
|---|---|---|---|
| 3,689,295 | 9/1972 | Hersey et al. | 106/727 |
| 4,482,383 | 11/1984 | McKenzie | 106/696 |
| 4,488,910 | 12/1984 | Nicholson et al. | 106/696 |
| 5,069,721 | 12/1991 | Tamura et al. | 106/727 |
| 5,232,497 | 8/1993 | Dillenbeck et al. | 106/823 |

FOREIGN PATENT DOCUMENTS 0966067  10/1982  U.S.S.R. ............................ 106/727

*Primary Examiner*—Mark L. Bell
*Assistant Examiner*—Paul Marcantoni
*Attorney, Agent, or Firm*—Howard J. Troffkin

[57] ABSTRACT

The present invention relates to the use of $\alpha$, $\beta$-amino alcohols as a cement admixture to inhibit drying shrinkage of resultant cement compositions.

16 Claims, No Drawings

LOW SHRINKAGE CEMENT COMPOSITION

BACKGROUND OF THE INVENTION

The present invention is directed to a cement composition admixture capable of reducing drying shrinkage and cracking resulting therefrom.

One of the major disadvantages of conventional cement compositions is that they tend to shrink during curing of the composition. This shrinkage results in cracks, and other defects in the resultant structure. Such cracks have both appearance and physical defects to the structure. For example, water can enter in the cracks and further deteriorate the structure through freeze-thaw pressures exerted by the water on the cement composition.

Various admixtures have been suggested as useful in reducing drying shrinkage and the resultant cracking. Japanese Patent Laid-Open Application 81/37259 and Japanese 87/10947 disclose the use of alcohol-alkylene oxide and alkylphenol-alkylene oxide adducts as useful for this purpose. However, these materials must be used in large dosages which causes their usage to be too expensive for practical use. $C_4$-$C_6$ alkyl alcohols, as disclosed in U.S. Pat. No. 5,181,961, have been suggested for use in inhibiting drying shrinkage. However, the alcohols are not highly effective under dry conditions and they tend to leach out under any wet condition encountered. In addition the lower alcohols have high vapor pressure at ambient conditions and are, therefore, difficult to handle.

Amino alcohols have been previously used in the cement industry. For example, lower alkanolamines, such as triethanolamine, diethanolamine and the like have been used, in small quantities, as a grinding aid to form cement powder from clinker nodule materials. Higher ($C_4$–$C_8$) trialkanolamines, such as triisopropanolamines, when added in very small amounts, provide enhanced strength to the resultant cement composition. Amino alcohols have been described in U.S. Pat. No. 5,176,152 to be a stabilizing agent for microsilica slurries to prevent the slurry from gelation and settlement of solids. Mortars can be formed from cement and the silica slurry composition. Finally, U.S. Pat. No. 3,583,880 teaches that shrinkage of porous organic products can be reduced by applying an alcohol, a monoalkyl ether or an amino alcohol to the surface of an already formed inorganic product.

A need continues to exist for a cement composition admixture and a resultant cement composition capable of inhibiting drying shrinkage. The admixture must be inexpensive, readily handleable at the job site and provide the desired inhibiting effect at low dosage levels.

SUMMARY OF THE INVENTION

The present invention provides a cement composition, capable of inhibiting drying shrinkage to cement compositions. The admixture provides the desired result under various environment conditions, when used in dosages of from 2 to 5 weight percent based on the dry weight of the cement contained in the treated composition. The subject admixture comprises at least one compound of the formula

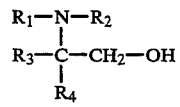

wherein $R_1$ and $R_2$ are each individually selected from hydrogen atom or a linear or branched alkyl group having 1 to 3 carbon atoms; $R_3$ and $R_4$ are each individually selected from hydrogen atom or a linear or branched alkyl group containing 1 to 8 carbon atoms provided that $R_3$ and $R_4$ groups together represent at least two (2) carbon atom containing groups.

DETAILED DESCRIPTION OF THE INVENTION

It has been presently found that certain aminoalcohols, when used as fully described herein below, are compounds capable of inhibiting drying shrinkage and the resulting stress cracks normally encountered in cement compositions.

Cement compositions undergo a sequence of stages during its complete curing process. From the initial hydration of the cement until set, the mass undergoes certain dimensional changes, including plastic shrinkage. The mass can, however, substantially overcome and correct for the stresses which occur at this stage. However, subsequent to set, the mass undergoes further dimensional changes which are called dry changes, including drying shrinkage. Although these changes are small in magnitude, they give rise to internal and external stresses which result in the formation of permanent cracks and deformations to the mass.

The admixture unexpectedly found to inhibit dry shrinkage is composed of at least one compound represented by the formula:

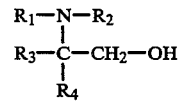

wherein $R_1$ and $R_2$ are each individually selected from hydrogen atom or a linear or branched alkyl group having 1 to 3 carbon atoms; $R_3$ and $R_4$ are each individually selected from hydrogen atom or a linear or branched alkyl group containing 1 to 8 carbon atoms provided that $R_3$ and $R_4$ groups together represent at least two (2) carbon atom containing groups.

The subject amino alcohols are $\alpha$, $\beta$ amino alcohol wherein $R_1$ and $R_2$ are preferably hydrogen atom and $R_3$ and $R_4$ are preferably individually selected from hydrogen or a $C_1$-$C_3$ alkyl group. Examples of the subject compounds are 2-amino-2-methyl-1-propanol, 2-amino-2-ethyl-1-propanol, 2-amino-1-butanol and 2-amino-2-methyl-1,3 propanediol and the like. The most preferred compounds are 2-amino-2-methyl-1-propanol and 2-amino-1-butanol.

The present cement composition admixture are solids or liquids which can be readily transported and readily dispersed in aqueous media or made solutions therewith. Thus, the subject admixtures can be introduced into and made part of a dry mix of cement and the subject admixture. Such mixtures can be formed with from about 90 to 99 weight percent cement and 1 to 10 (preferably 2 to 5) weight percent of the present amino alcohol admixture. Although certain of the subject amino alcohols are liquids, they can be readily mixed with the dry cement powder in known manners either neat or as aqueous solutions to provide a powder solid product having the subject amino alcohol distributed therein. This treated cement can be readily used to form cement compositions, e.g. concrete having enhanced properties.

The present admixture can, alternately, be added (either in its solid state or as a solution or dispersion) as part of the mixing of components used in forming a cement composition. The amino alcohol can be formed into an aqueous solution to be used as an admixture which is introduced into the cement composition at the job site as part of the water of hydration or at the ready-mix batching plant. The amino alcohol should be present in the cement composition in from at least 1 to about 10 weight percent based on the cement contained in the composition.

The presently described admixture can be used to inhibit drying shrinkage in a variety of cement compositions, such as pastes (cement and water), mortars (cement, sand and water) and concretes (cement, sand, gravel and water). Suitable cement include ordinary portland cements (e.g. ASTM type I), special portland cement (high early strength portland cement and moderate heat portland cement), portland blast furnace slag cement, portland fly ash cement, as well as blended and high aluminous cement, for example.

In the preparation of a cement composition of the invention, aggregates such as gravel, sand, pumice and burned perlite may be used in known manners according to the specific application. Further, conventional water-reducing agents, air-entraining agents, expansive agents, shrinkage-reducing agents other than the present invention, and other known admixtures for mortar or concrete may be jointly used.

Examples of known additives for mortar and concrete include hardening accelerators, such as metal chlorides (e.g. calcium chloride); hardening retarders such as saccharides, starches, hydroxy carboxylic acids and glycerol; and corrosion inhibitors for reinforcing steel, such as sodium nitrite and calcium nitrite. The amount of such an optional additive are conventionally added to cement in from 0.1 to 5 wt. % based on the cement content.

The amount of water to be added according to the invention is not critical as long as it is sufficient to effect hydration. The water/cement ratio is usually about 0.3 to 0.6, and preferably from 0.35 to 0.5.

It has been found that the present admixture provides a further enhanced cement composition when used in combination with a water-reducing agent. Although the amino alcohols described above can be used alone and provides both drying shrinkage inhibition and permits reduction in water, the composition when having both the subject amino alcohols and water-reducing agent provides enhanced properties. Examples of suitable, water-reducing agents are naphthalenesulfonate-formaldehyde condensates, ligninsulfonates, melaminesulfonate-formaldehydes, polyacrylates and the like. The amount of such water reducing agent to be used can range in from 0.05 to 5 weight percent based on the cement content of the formed composition.

The water-reducing agent can be added to the cement composition in ordinary manners, as part of any other admixture or with the present drying shrinkage control agent when added to the mixture of cement, aggregate and water.

The drying shrinkage inhibiting agent of the present invention can be added either to a dry cement or to a mixture of cement and other appropriate components forming the desired cement composition. Because the present admixture is either a solid or a low vapor pressure, high boiling liquid, it can be readily handled and stored without concern of evaporation and lack of potency at time of use. Thus, the present amino alcohols shrinkage reducing agent can be either dry mixed with the cement powder, or spray applied to the cement powder with further mixing. When the cement composition is a cement paste, the cement composition can be prepared by using a pre-mixed cement agent which is mixed with water, or a prescribed amount of the shrinkage-reducing agent is first dissolved in solution and then the solution is mixed with cement. If the cement composition is a mortar or concrete, a composition of the shrinkage reducing agent in an aqueous solution, emulsion or dispersion may be first prepared and then mixed with cement and aggregate, or a given amount of the shrinkage-reducing agent is added to a mixture of cement, water, and aggregate while they are being stirred.

The cement composition may be cured using any of the atmospheric, wet air, water, and or heat-accelerated (steam, autoclave, etc.) curing techniques. If desired, two or more such techniques may be combined. The respective curing conditions may be the same as in conventional ones.

The present amino alcohols are formed in known manners by simple processing techniques. Further, the present shrinkage and crack control agents of the present invention are effective in dosages of from 1 to 10 weight percent based on the cement component of the cement composition. It is preferred to use from 2 to 5 and most preferably to use from 2 to 4 weight percent of the present agent based on cement content. When the subject and water reducing agent are used in combination, the weight ratio of these components are 100:1 to 1:5 and preferably from 10:1 to 1:2.

The following example is given for illustrative purposes only and are not meant to be a limitation on the claims appended hereto. All parts and percentages are by weight unless otherwise indicated.

EXAMPLE 1

A micro-concrete composition composed of a mortar specifically designed to simulate concrete was formed using portland cement, and fine aggregate of varying particle size. The composition was formed of the following mix:

| Components | Part by Weight |
|---|---|
| Cement | 100 |
| Sand A | 60 |
| Sand B | 54 |
| Sand C | 54 |
| Sand D | 102 |

Sand A had the following particle size distribution:
0.00% retained on 600 micron sieve size openings (reported as "0.00%/600"), 0.4%/425, 2%/300, 8%/212, 33%/150, 39%/106, 15%/75 and 2.6%/53.

Size B had a particle size of 150 to 1180 micron in accordance with ASTM C-778.

Sand C had a particle size of 600 to 1180 micron in accordance with ASTM C-778.

Sand D had the following particle size distribution:

0.00%/5000, 12.7%/2360, 55.7%/1700, 25.5%/1180, 5.4%/850 and 0.7/600.

The various sand components were mixed together using a low speed mixer. The cement was then added with further mixing to form a substantially uniform blend. To this blend was added 42 parts water to provide a water to cement ratio of 0.42. After one minute of mixing, 2-amino-2-methyl-1-propanol was added neat at the rate of 2.4% by weight of cement. Mixing was continued at low speed for 8 minute and the mix was then poured into eight mould each having dimensions of 25×25×285 mm. The specimens were cured for 24 hours in a chamber maintained at 100% relative humidity, demolded and then four (4) of the formed bars were cured for 6 additional days at 100% relative humidity and 23° C. These samples were then transferred to the environmental chamber at 50% relative humidity. This regimen was referred to as "moist cure". The remaining four (4) of the formed bars were placed immediately after demolding in a chamber maintained at 50% relative humidity and 23° C. (referred to as "dry cure") in order to measure drying shrinkage at different conditions. Each of the bars was measured at regular intervals for changes in linear length using a comparator described in ASTM C-490.

The results are given in Tables 1 and 2 below for dry cure and moist cure conditions as change in length (measured length minus original length divided by original length) with respect to time. Thus, a negative value connotes shrinkage in the length of the sample.

For comparative purposes, samples were also formed in the same manner as described above except that 2-amino-2-methyl-1-propanol (AMP) agent was omitted (control). The samples were tested in the same manner as described above and the results are given in Table 1 (for dry cure conditions) and Table 2 (for moist care conditions).

TABLE 1

UNRESTRAINED DRYING SHRINKAGE
DRY CURE CONDITIONS
LENGTH CHANGE ($\times 10^{-6}$)

| EXAMPLE | 1 WEEK | 2 WEEKS | 4 WEEKS |
|---|---|---|---|
| AMP | −325.9 | −360 | −437 |
| Control | −459 | −563 | −591 |

TABLE 2

UNRESTRAINED DRYING SHRINKAGE
MOIST CURE CONDITIONS
LENGTH CHANGE ($\times 10^{-6}$)

| EXAMPLE | 1 WEEK | 2 WEEKS | 4 WEEKS |
|---|---|---|---|
| AMP | +40 | −225 | −454 |
| Control | +33 | −444 | −667 |

The above data shows that samples which contained 2 amino-2-methyl-1-propanol shrinkage reducing agent of the present invention exhibited substantially less drying shrinkage in comparison to samples without the subject AMP. Specifically, the dry cure samples with AMP exhibited about 30% less drying shrinkage under dry cure conditions and about 50% less shrinkage under moist cure conditions with respect to sample prepared with water only.

EXAMPLE 2

A mix was prepared as in Example 1 above, except that 2.4% of 2-amino 1-butanol was added instead of 2-amino-2methyl-1-propanol. The admixture was added neat after the addition of water. The shrinkage data obtained for the amino butanol-containing mortar samples are shown in Tables 3 and 4. Table 3 presents the data under dry cure conditions whereas Table 4 shows the results under moist cure conditions.

TABLE 3

UNRESTRAINED DRYING SHRINKAGE (DRY CURE)
RELATIVE LENGTH CHANGE ($\times 10^{-6}$)

| EXAMPLE | 1 WEEK | 2 WEEKS | 4 WEEKS |
|---|---|---|---|
| Aminobutanol | −280 | −332 | −431 |
| Control | +459 | −563 | −591 |

TABLE 4

UNRESTRAINED DRYING SHRINKAGE (MOIST CURE)
RELATIVE LENGTH CHANGE ($\times 10^{-6}$)

| EXAMPLE | 1 WEEK | 2 WEEKS | 4 WEEKS |
|---|---|---|---|
| 2-Aminobutanol | −24 | −213 | −480 |
| Control | +33 | −444 | −667 |

The above data shows that samples which contained amino butanol shrinkage reducing agent of the present invention exhibited substantially less drying shrinkage in comparison to samples without the subject 2-amino-1-butanol. Specifically, the dry cure samples with amino butanol exhibited 40% less drying shrinkage under dry cure conditions and about 50% less under moist cure conditions with respect to the sample prepared with water only.

What is claimed:

1. A cement admixture useful in controlling drying shrinkage of a cement composition comprising a mixture of at least one compound of the formula:

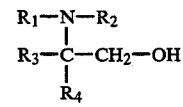

wherein $R_1$ and $R_2$ are each individually selected from hydrogen atom or a linear or branched alkyl group having 1 to 3 carbon atoms; $R_3$ and $R_4$ are each individually selected from hydrogen atom or a linear or branched alkyl group containing 1 to 8 carbon atoms provided that $R_3$ and $R_4$ groups together represent at least two (2) carbon atom; and at least one cement water-reducing agent; wherein the weight ratio of compound to agent is 1–10:0.05–5.

2. The admixture of claim 1 wherein $R_1$ and $R_2$ are each a hydrogen atom.

3. The admixture of claim 2 wherein $R_3$ and $R_4$ are each a methyl group.

4. The admixture of claim 2 wherein $R_3$ represents an ethyl group and $R_4$ represents hydrogen atom.

5. An improved cement comprising from 90 to 99 weight percent of a hydraulic cement powder selected from portland cement, or aluminous cement and having uniformly dispersed therein from 10 to 1 weight percent of at least one compound of the formula:

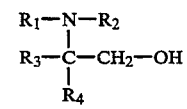

wherein $R_1$ and $R_2$ are each individually selected from hydrogen atom or a linear or branched alkyl group having 1 to 3 carbon atoms; $R_3$ and $R_4$ are each individually selected from hydrogen atom or a linear or branched alkyl group containing 1 to 8 carbon atoms provided that $R_3$ and $R_4$ groups together represents at least two (2) carbon atoms.

6. The cement of claim 5 wherein $R_1$ and $R_2$ are each a hydrogen atom.

7. The cement of claim 6 wherein $R_3$ and $R_4$ are each a methyl group.

8. The cement of claim 6 wherein $R_3$ represents an ethyl group and $R_4$ represents a hydrogen atom.

9. An improved cement composition comprising cement, sand, aggregate and water and having uniformly dispersed therein from 1 to 10 weight percent based on the cement of at least one compound of the formula:

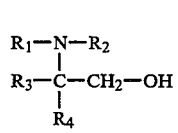

wherein $R_1$ and $R_2$ are each individually selected from hydrogen atom or a linear or branched alkyl group having 1 to 3 carbon atoms; $R_3$ and $R_4$ are each individually selected from hydrogen atom or a linear or branched alkyl group containing 1 to 8 carbon atoms provided that $R_3$ and $R_4$ groups together represents at least two (2) carbon atoms.

10. The composition of claim 9 which further contains a cement water reducing agent.

11. The composition of claim 9 wherein $R_1$ and $R_2$ are each a hydrogen atom.

12. The composition of claim 10 wherein $R_1$ and $R_2$ are each a hydrogen atom.

13. The composition of claim 11 wherein $R_3$ and $R_4$ are each a methyl group.

14. The composition of claim 12 wherein $R_3$ and $R_4$ are each a methyl group.

15. The cement of claim 11 wherein $R_3$ represents an ethyl group and $R_4$ represents a hydrogen atom.

16. The cement of claim 12 wherein $R_3$ represents an ethyl group and $R_4$ represents a hydrogen atom.

* * * * *